United States Patent
Sharma et al.

(10) Patent No.: US 11,797,877 B2
(45) Date of Patent: Oct. 24, 2023

(54) AUTOMATED SELF-HEALING OF A COMPUTING PROCESS

(71) Applicant: Accenture Global Solutions Limited, Dublin (IE)

(72) Inventors: Sunil Sharma, Pune (IN); Rajendra Venkata Palem, Pune (IN); Amit Agarwal, Pradhikharan Nigdi Pune (IN)

(73) Assignee: Accenture Global Solutions Limited, Dublin (IE)

( * ) Notice: Subject to any disclaimer, the term of this patent is extended or adjusted under 35 U.S.C. 154(b) by 1570 days.

(21) Appl. No.: 15/728,771

(22) Filed: Oct. 10, 2017

(65) Prior Publication Data
US 2019/0065990 A1    Feb. 28, 2019

(30) Foreign Application Priority Data

Aug. 24, 2017   (IN) .............................. 201711030005

(51) Int. Cl.
*G06N 20/00* (2019.01)
*G06N 5/04* (2023.01)
(Continued)

(52) U.S. Cl.
CPC ............... *G06N 20/00* (2019.01); *G06N 3/04* (2013.01); *G06N 3/08* (2013.01); *G06N 5/04* (2013.01); *G06Q 20/00* (2013.01)

(58) Field of Classification Search
CPC .......... G06N 20/00; G06N 3/04; G06N 3/08; G06N 5/04; G06Q 20/00
See application file for complete search history.

(56) References Cited

U.S. PATENT DOCUMENTS

| 7,904,297 B2* | 3/2011 | Mirkovic ................ G06F 40/40 704/235 |
| 8,364,613 B1 | 1/2013 | Wei-Hao et al. |

(Continued)

FOREIGN PATENT DOCUMENTS

WO    WO2001022285    3/2001

OTHER PUBLICATIONS

European Search Report in European Application No. 18190185.1, dated Dec. 19, 2018, 7 pages.
(Continued)

*Primary Examiner* — Kakali Chaki
*Assistant Examiner* — Ababacar Seck
(74) *Attorney, Agent, or Firm* — Fish & Richardson P.C.

(57) ABSTRACT

Methods, systems, and apparatus, including computer programs encoded on a computer storage medium, for receiving training data for multiple datasets that include information about a computing process. The training data is received at a computing system that includes a data manager, a data classifier, and a machine learning (ML) system. The data classifier annotates the training data as being associated with a particular dataset and as being descriptive of computing processes executed to perform transactions. The ML system receives the annotated training data and data about a transaction operation of the system, trains a predictive model to generate prediction data that indicates a runtime condition of the system, and provides the prediction data to a process automation module of the system. The module executes process automation scripts to remediate the computing process, where the computing process is executed by the system to perform the real-time transaction operation.

21 Claims, 5 Drawing Sheets

(51) Int. Cl.
*G06N 3/08* (2023.01)
*G06N 3/04* (2023.01)
*G06Q 20/00* (2012.01)

(56) References Cited

U.S. PATENT DOCUMENTS

| | | | | |
|---|---|---|---|---|
| 8,370,280 | B1* | 2/2013 | Lin | G06N 5/04 |
| | | | | 706/12 |
| 8,706,656 | B1 | 4/2014 | Wei-Hao et al. | |
| 9,934,430 | B2* | 4/2018 | Dolfing | G06N 3/088 |
| 11,120,132 | B1* | 9/2021 | Salour | H04L 63/1425 |
| 2007/0226259 | A1* | 9/2007 | Kacin | G06F 9/45512 |
| 2008/0313110 | A1* | 12/2008 | Kreamer | G06Q 10/1097 |
| | | | | 706/14 |
| 2009/0172470 | A1* | 7/2009 | Bobak | G06F 11/1482 |
| | | | | 714/2 |
| 2010/0049654 | A1* | 2/2010 | Pilo | G06Q 20/02 |
| | | | | 705/43 |
| 2010/0070952 | A1* | 3/2010 | Anand | G06F 8/658 |
| | | | | 717/142 |
| 2011/0145653 | A1* | 6/2011 | Broadfoot | G06F 11/3604 |
| | | | | 714/E11.217 |
| 2012/0266136 | A1* | 10/2012 | Brown | G06F 11/3672 |
| | | | | 717/124 |
| 2014/0180738 | A1* | 6/2014 | Phillipps | G06N 20/10 |
| | | | | 705/7.38 |
| 2014/0310222 | A1* | 10/2014 | Davlos | G06F 11/2294 |
| | | | | 706/46 |
| 2014/0372513 | A1* | 12/2014 | Jones | G06F 9/5072 |
| | | | | 709/203 |
| 2015/0149400 | A1* | 5/2015 | Werner | G06F 16/283 |
| | | | | 707/600 |
| 2015/0178182 | A1* | 6/2015 | Mallya | G06F 11/3664 |
| | | | | 717/124 |
| 2015/0186242 | A1* | 7/2015 | Funk | G06F 11/3089 |
| | | | | 702/186 |
| 2015/0340034 | A1 | 11/2015 | Scalkwyk | |
| 2016/0086185 | A1* | 3/2016 | Adjaoute | G06Q 20/4016 |
| | | | | 705/44 |
| 2016/0378649 | A1* | 12/2016 | Eilam | G06F 11/3692 |
| | | | | 717/131 |
| 2017/0006135 | A1* | 1/2017 | Siebel | G06N 20/00 |
| 2017/0177272 | A1* | 6/2017 | Ilangovan | G06F 11/3466 |
| 2018/0267887 | A1* | 9/2018 | Dsouza | G06F 40/30 |
| 2019/0050734 | A1* | 2/2019 | Li | G06N 3/0454 |

OTHER PUBLICATIONS

IN Office Action in Indian Appln. No. 201711030005, dated Sep. 16, 2020, 8 pages.

* cited by examiner

AUTOMATED SELF-HEALING OF A COMPUTING PROCESS

CROSS-REFERENCE TO RELATED APPLICATION

This application claims priority to Indian Patent Application No. 201711030005, filed on Aug. 24, 2017, entitled "AUTOMATED SELF-HEALING OF A COMPUTING PROCESS," the entirety of which is hereby incorporated by reference.

FIELD

The present specification is related to remediating a computer process.

BACKGROUND

Networked systems for completing transactions between commercial entities and invoice processing operations exist in client server environments or hybrid environments. These networked systems may combine traditional mainframe processing while distributing some processes to remote servers. Some client server systems can be used to handle an increasing number of processes distributed over various machines for completing certain transactions and operations. For example, such systems allow entities to digitally exchange different kinds of data with each other using computing processes performed through a computer network.

A transaction can involve an entity providing (or receiving) payment from a vendor or other another entity for goods or services. In some transaction scenarios, parties may exchange electronic messages (e.g., E-mail), purchase orders, approvals and inventories, as well as myriad of other information through a computer network. For example, a computer system may perform a transaction using a local or remote server, however, a computer process for completing the transaction may stall or fail for a variety of reasons. Some failed computer processes may go undetected leading to incomplete transactions which can result in delayed payments or unshipped goods between commercial entities.

SUMMARY

This specification describes systems and methods for remediating a computer process. A computing system receives training data that includes information about a computing process executed by the system. The training data can be derived from multiple datasets and the computing system can include a data manager, a data classifier, and a machine learning (ML) system. The data manager includes database functionality for receiving and storing the training data and the data classifier annotates training data provided by the data manager. For example, the data classifier can annotate the training data as being associated with a particular dataset of the multiple datasets, as being descriptive of computing processes executed by the system to perform transaction operations, or both.

The ML system receives annotated training data and data about a real-time transaction operation of the computing system. The ML system trains a predictive model based on iterative analysis of: i) annotated training data; and ii) data about real-time transactions being processed or performed by the system. A trained predictive model generates prediction data indicating a runtime condition of the system during performance of the real-time transaction, and provides the prediction data to a process automation module of the system. The automation module executes process automation scripts to remediate a computing process identified based on the runtime condition, and that is executed by the system to perform the real-time transaction operation.

One aspect of the subject matter described in this specification can be embodied in a computer-implemented method. The method includes, receiving, at a data manager of a computing system, training data for a plurality of datasets, the training data comprising information about one or more computing processes; and annotating, by a data classifier of the computing system, the training data as: being associated with a particular dataset of the plurality of datasets; and being descriptive of computing processes that are executed to perform multiple respective transactions.

The method further includes, receiving, at a machine learning system of the computing system, annotated training data and data about a real-time transaction operation of the computing system, wherein the machine learning system: trains a predictive model based on iterative analysis of the annotated training data and the data about the real-time transaction operation, the trained predictive model being configured to generate prediction data using inferences learned during training of the predictive model; and provides prediction data indicating a runtime condition of the computing system when the computing system performs the real-time transaction operation.

The method also includes, receiving, at a process automation module of the computing system, the prediction data provided by the machine learning system that indicates the runtime condition and the data about the real-time transaction operation; and executing, by the process automation module and based in part on the runtime condition, at least one process automation script for remediating a computing process being executed by the computing system to perform the real-time transaction operation.

In some implementations, the method further includes: performing, using a neural network of the machine learning system, inference computations for deep-learning operations based on analysis of the training data for the plurality of datasets; and generating, by the machine learning system, the predictive model based on the deep-learning operations performed by the neural network.

In some implementations, executing the at least one process automation script includes: identifying, by the computing system, an opportunity to remediate at least one computing process being executed by the computing system to perform the real-time transaction operation; and executing the process automation script in response to identifying the opportunity to remediate the at least one computing process.

In some implementations, annotating the training data by the data classifier includes: identifying a first portion of the training data as being linked to a technical information dataset of the plurality of datasets; identifying a second portion of the training data as being linked to a commercial information dataset of the plurality of datasets; and labeling the first portion and the second portion of the training data as data for successful execution of computing processes for performing a particular transaction operation.

In some implementations, executing the at least one process automation script includes: accessing a script repository that includes a plurality of process automation scripts and identifying at least a subset of scripts from among the plurality of process automation scripts; generating a respective confidence score for each script in the subset of scripts; and executing the at least one process automation script based on analysis of the respective confidence score for each script in the subset of scripts.

In some implementations, generating a respective confidence score for each script in the subset of scripts includes: analyzing the prediction data that indicates the runtime condition, the data about the real-time transaction operation, and data about previous attempts at remediating a particular computing process; in response to analyzing, determining, for each script in the subset, an amount of relevance between the script and at least the runtime condition indicated by the prediction data; and generating the respective confidence score for the script based on the determined amount of relevance.

In some implementations, the method further includes: accessing, by the process automation module, a plurality of remediation logs that each include data about remediating different computing processes; using, by the process automation module, a process automation script generator to generate the plurality of process automation scripts; and storing, by the process automation module, the plurality of process automation scripts in the script repository.

In some implementations, the runtime condition includes at least one of: i) a processor utilization metric that indicates an amount of processing resources that are being used when the computing system performs the real-time transaction operation; ii) a memory utilization metric that indicates an amount of memory resources that are being used when the computing system performs the real-time transaction operation; or iii) a time parameter that indicates an amount of time the computing system has spent performing the real-time transaction operation.

In some implementations, data about the real-time transaction operation of the computing system includes at least one of: i) information about entities that are involved in a commercial transaction; ii) information about the contents of a commercial invoice for an exchange goods or services between the entities involved in the commercial transaction; or iii) content items included in information being processed to cause pecuniary resources to be provided from a first entity of the commercial transaction to a second entity of the commercial transaction.

Other implementations of the above and other aspects include corresponding systems, apparatus, and computer programs, configured to perform the actions of the methods, encoded on computer storage devices. An electronic system of one or more computers can be so configured by virtue of software, firmware, hardware, or a combination of them installed on the electronic system that in operation cause the system to perform the actions. One or more computer programs can be so configured by virtue of having instructions that, when executed by data processing apparatus, cause the apparatus to perform the actions.

The subject matter described in this specification can be implemented in particular implementations and can result in one or more of the following advantages. The described subject matter can be implemented to automate data monitoring, incident processing, and remediation or correction of failed computer processes that can occur in an example computing environment. A machine learning system generates prediction data providing detailed information about runtime conditions of processor and memory resources. The resources are used within the computing environment to execute computer processes for performing transactions in real-time.

Entities may experience computing deficiencies based on excessive use of computing resources which can lead to computer process failures when performing certain commercial transactions. The described teachings enable computing systems to realize efficiencies, such as increased system throughput and reduced processor utilization. Efficiencies can be realized by identifying stagnant or failed computer processes using datasets that include real-time transaction data and prediction data. These datasets indicate processor and memory usage metrics that exceed a threshold usage metric. Automated processes for generating scripted files based on analysis of these datasets are described. Scripted files can be automatically executed to remediate failed computer processes, thereby leading to an improved operation of the computer system.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
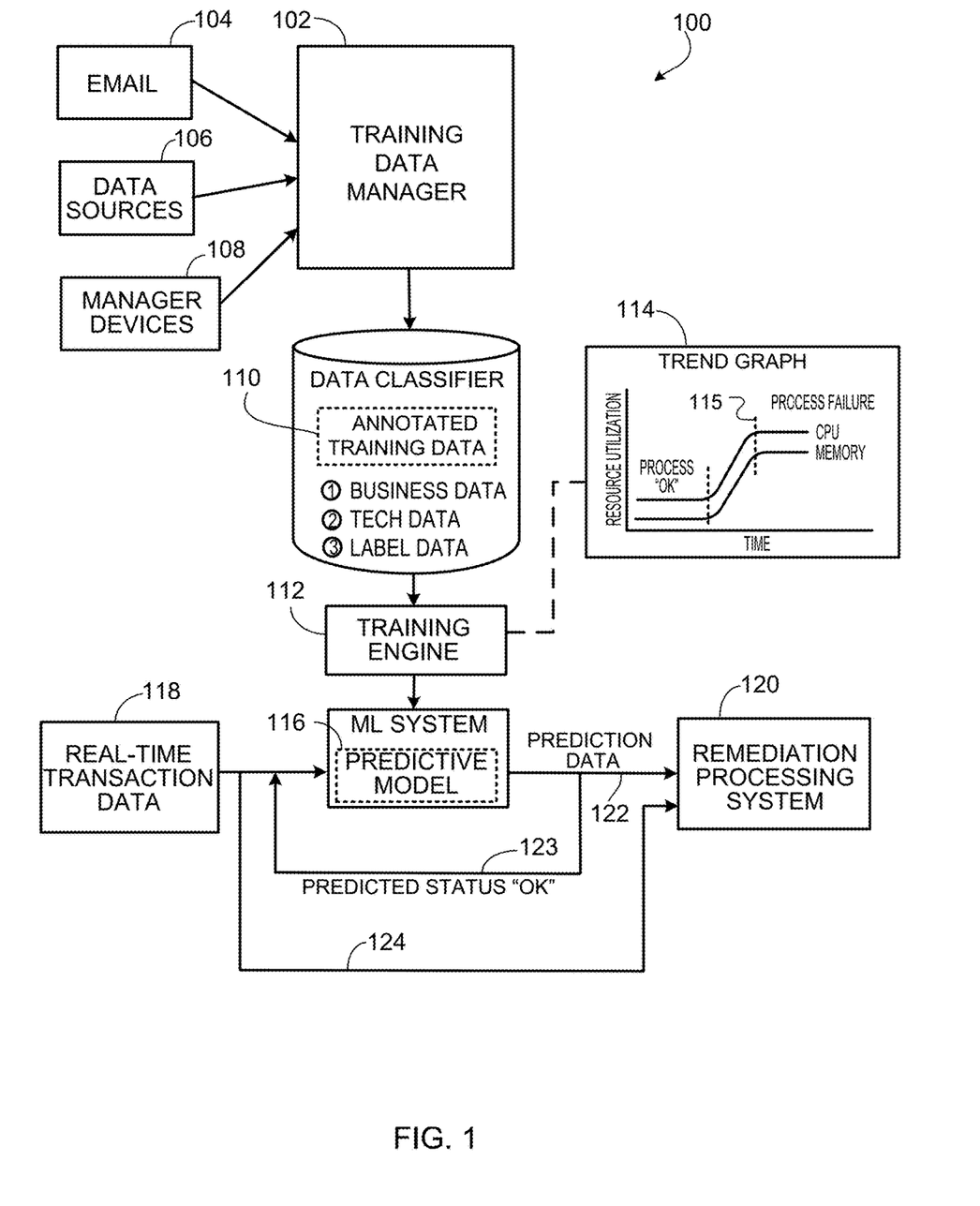
FIG. 1 illustrates a block diagram of an example computing system for remediating a computer process.

FIG. 1 illustrates a block diagram of an example computing system 100 for remediating a computer process. System 100 receives training data associated with multiple datasets, annotates the training data, and uses the training data to train a predictive model that generates prediction data for identifying computing processes that require remediation. System 100 uses at least one process automation module of a remediation processing system to generate, select, and execute process automation scripts based in part on analysis of remediation log data, the prediction data, and real-time data about on-going computing operations and transactions. As shown in FIG. 1, system 100 generally includes training data manager 102, training engine 112, predictive model 116, and a remediation processing system 120.

Data manager 102 is a predictive model training data manager that receives and stores data and information associated with multiple datasets. The datasets can include log files and other information about electronic correspondences 104 (e.g., e-mails), information compiled from network manager devices 108 and software applications, and information from multiple data sources 106 generally present in an example computer network, e.g., processor and memory utilization values. The information compiled from network manager devices and applications can include workflow and batch processing data, status information about recurring computer-based transactions, and data about computer implemented operations and processes.

In some implementations, data manager 102 is an example database system that includes memory for storing program code or software instructions and processors for executing the code to cause performance of certain database management functions. For example, data manager 102 can mine or obtain data for the multiple datasets and perform various data extraction, comparison, and analysis functions. Moreover, data manager 102 can annotate, compile, and store a variety of training data in the memory of data manager 102.

Annotated training data 110 corresponds to training data that is annotated and stored in an electronic storage medium of system 100 based on the database management functions performed by data manager 102. For example, system 100 can use an example data classifier of data manager 102 to annotate training data obtained from the multiple datasets. The data classifier can execute annotation computing logic to annotate received training data by scanning or analyzing the training data to identify one or more types of data.

Data manager 102 can analyze signal data (non-transitory signals) associated with distinct data types or other content included in the training data to annotate the data. In some implementations, the data classifier analyzes signal data to annotate the training data as: i) being associated with a particular dataset of the multiple datasets; ii) being descriptive of computing processes that are executed to perform multiple respective transactions, or both. Based on this signals analysis, data manager 102 can identify and/or extract the data types and store the data types in a memory or storage-medium of system 100. As described in more detail below, stored data types may then be accessed and used by computing modules of system 100 to perform computations and computing operations for remediating computer processes executed by system 100.

As used in this specification, the term "module" is intended to include, but is not limited to, one or more computers/computing devices configured to execute software instructions that include program code that causes a processing unit(s) of the computing device to execute one or more functions. The term "computer" is intended to include any data processing or computing devices/systems, such as a desktop computer, a laptop computer, a mainframe computer, a personal digital assistant, a server, a handheld device, or any other device able to process data.

The types of data can include distinct data types, such as business data, technical data, and label data. In some implementations, business data can include details or information about commercial and financial transactions between two entities, as well as other data relating to commercial or business operations of at least business entity, e.g., account payment operations or operations for delivering goods and services. Technical data can include details or information about computer processes, such as processor and memory utilization metrics for computer processes executed by modules of system 100 during performance of transaction operations for certain business or commercial activities between entities.

Label data can include details about data labels (as well as the labels themselves) that provide information about individual data markers, such as a parameter value being graphed either as a number or as a percent. In some implementations, label data include labels or markers that identify data types of the business data and technical data described above. For example, labels or markers can include "CPU_1" or "memory_1" identifying a particular central processing unit or memory device, or "50%" indicating a particular usage relative to CPU_1's usage capacity or memory_1's usage capacity. Other labels or makers can include "payment operation," "batch_1," or "application 1." In some implementations, label data can also include labels and pointers, such as a sequence of characters, that identify certain locations within source code for software instructions executed by system 100.

Training engine 112 receives annotated training data 110 from data manager 102 and analyzes the data to identify aspects or subsets of data that can be used by predictive model 116 (described below) to generate prediction data. In some implementations, training engine 112 is a computing module of system 100 that performs one or more data analytics processes on annotated training data 110. For example, training engine 112 can analyze the distinct data types of annotated training data 110, identify at least a subset of labels and data parameter values of data 110, and generate an example trend graph 114 for visualizing certain trends of the labels and parameter values.

Trend graph 114 can include graphical data for visualizing parameter values that indicate, e.g., processor (CPU) and memory resource utilization. As described below, data trends may indicate computing scenarios in which resource utilization exceeds a threshold usage capacity 115. In some implementations, computer processes executed by modules of system 100 to perform transactions may fail when utilization of particular resources exceed threshold usage capacity 115. System 100 can use data trends identified by training engine 116 to generate predictions that indicate or identify computer process failures that require remediation.

Predictive model 116 can be associated with an artificial neural network (ANN), e.g., a deep neural network, that is used to execute various machine learning operations. For example, system 100 can include a machine learning ("ML") system formed at least from an ANN on a hardware circuit or processor microchip. System 100 can receive the training data described above (and other data), use training engine 112 to form subsets of annotated training data inputs, and use the ML system to process the data inputs (training data and other data) through respective layers of the ANN.

Processing the data inputs through layers of the ANN enables system 100 to identify patterns in the data and determine inferences that can translate to prediction data 122. In particular, processing the data inputs through layers of the ANN enables the ML system to generate or train predictive model 116 based at least on iterative analysis of various data inputs (training data and other data).

For example, the ML system can use the ANN to perform inference computations for deep-learning operations based on analysis of the training data inputs and data inputs for transaction operations. The ML system generates predictive model 116 based on the deep-learning operations performed by the ANN. Predictive model 116 can be trained to perform computations for generating prediction data 122 based on patterns (and inferences) identified from deep-learning analysis executed by the ANN during processing of the data inputs.

In addition to the training data inputs, the ML system can also receive data inputs that include information about real-time transaction operations (described below) that are performed based on modules of system 100 executing certain computer processes. As indicated above, computer processes can be executed to perform transaction operations, e.g., in real-time, for certain business activities between at least two commercial entities. In some implementations, the data inputs about real-time transaction operations ("transaction data inputs 118") can include the distinct data types described above, e.g., business data, technical data, label data, or combinations of each.

Model 116 is a predictive analytics model that leverages machine learning techniques to automatically source and combine all available data sets of system 100 to generate prediction data 122. For example, during operation, a trained predictive model 116 receives at least transaction data inputs 118 or at least the subset of annotated training data 110 (e.g., that includes labels and/or data parameter values) and uses these data inputs to predict whether one or more computer processes of system 100 require remediation.

For example, model 116 can be used to: i) programmatically identify and predict whether particular computer processes are experiencing, or likely to experience, process failure; ii) prioritize failed, or potentially failing, computer processes for remediation based on these predictions; or iii) both items i) and ii). The predictions can be represented by parameter values of prediction data 122 and can indicate a runtime condition of system 100 when system 100 performs the real-time transaction operation. As shown, FIG. 1 includes a feedback path 123 representing prediction outcomes where prediction data 122 does not identify processing failures.

Remediation processing system 120 is a sub-system of system 100 and includes process automation modules that are used by system 100 to remediate computer processes. At least one process automation module of system 120 receives prediction data 122 indicating the runtime condition and transaction data 118 about the real-time transaction operation. In some implementations, system 120 receives transaction data 118 via a data communication path 124 that differs from a communication path for receiving predication data 122.

In some implementations, system 120 receives transaction data 118 and prediction data 122 that indicates one or more of: i) a runtime condition where CPU_1 has exceeded a threshold usage capacity of 75%; ii) that CPU_1 is being used to perform a batch processing job for a real-time payment transaction operation; iii) an application program or application server being used to execute the batch processing job; and iv) at least one computer process for performing the batch processing job that requires remediation.

Remediation processing system 120 uses at least one process automation module to execute automation scripts based, at least in part, on the runtime condition and transaction data 118. An automation script can include automated processes for remediating a computing process being executed by system 100 to perform a real-time transaction operation. Remediation processing system 120 and process automation modules of system 120 are described in more detail below.

Figure 2:
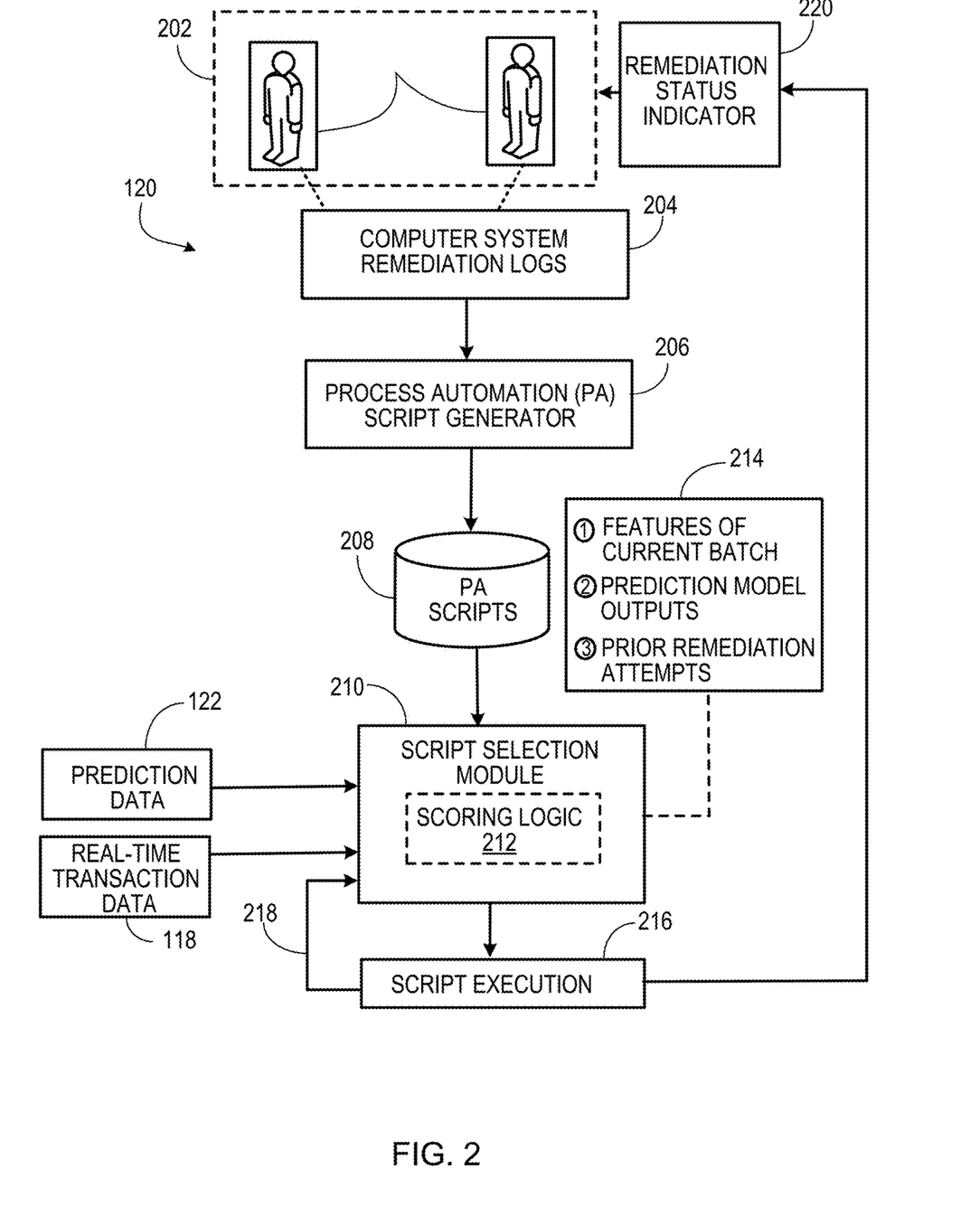
FIG. 2 illustrates a block diagram of a remediation processing system used to remediate a computer process.

FIG. 2 illustrates a block diagram of the remediation processing system 120 described above. System 120 can include one or more process automation modules that are used to remediate a computer process. System 120, as well as system 100, can include processors, memory devices, and electronic data storage mediums that collectively form one or more computing modules of systems 100, 120. Processors of the computing modules process instructions for execution by systems 100, 120, including instructions stored in the memory devices or on the storage mediums to perform data analysis and data computations for remediating computer processes and displaying graphical information for a graphical user interface (GUI) at an example display of systems 100, 120.

Execution of the stored instructions can cause one or more of the actions described herein to be performed by systems 100, 120, or the ML system. In other implementations, multiple processors may be used, as appropriate, along with multiple memories and types of memory. For example, systems 100, 120 can include, or be connected with, multiple computing devices, with each device (e.g., a server bank, groups of servers, modules, or a multi-processor system) performing portions of the actions or operations associated with the various processes or logical flows described in this specification.

Remediation processing system 120 generally includes at least one electronic or computer-readable storage medium storing remediation logs 204 and program code for a process automation script generator 206 that produces or generates automation scripts based in part on the remediation logs 204. In some implementations, at least a subset of the remediation logs 204 are created, stored, accessed, and modified by one or more users 202.

System 120 further includes process automation scripts 208 produced by script generator 206 and that are stored in an electronic storage medium of system 120 and a script selection module 210 that executes program code or software instructions for scoring logic 212. System 120 also includes a script execution module 216 for executing automation scripts 208 selected by selection module 210 and status data 218 that indicates a processing status of the scripts 208 that are selected for execution by selection module 210.

Executing a process automation script can include system 100 identifying an opportunity to remediate at least one computer process being used by a computing module of system 100 to perform a real-time transaction operation. The process automation script can be executed in response to system 100 identifying the opportunity to remediate the computer process, where the system 100 identifies the opportunity based on data indications included in prediction data 122 and transaction data inputs 118. For example, prediction data 122 can indicate that a batch computing process has failed based on CPU_1 exceeding a threshold usage capacity of 80% for a time period that exceeds one minute. Hence, predication data 122 includes a data indication that represents, or identifies, a failed computer process.

Executing the process automation script can include script selection module 210 accessing a script repository corresponding to a storage medium that includes multiple process automation scripts 208. In some implementations, module 210 identifies at least a subset of scripts from among the multiple process automation scripts 208 based on the data indications of prediction data 122 as well as information included in transaction data 118. For example, script selection module 210 can analyze data indications of prediction data 122, analyze information about a real-time transaction operation identified by transaction data 118, or both.

In response to analyzing one, or both, of data 118 and 122, module 210 can use scoring logic 212 to generate respective confidence scores for each automation script in the subset of scripts based on the analysis of data 118, 122. Scoring logic 212 can include software instructions for assessing information about a failed computer process, comparing the assessed information to data about each script in a subset of scripts, and generating confidence scores for respective scripts in the subset based on the comparison.

Module 210 can use multiple data items 214 as inputs accessed by scoring logic 212 to generate the confidence scores. In some implementations, generating a confidence score for each script in a subset of scripts includes module 210 executing scoring logic 212 to: i) analyze a runtime condition based on prediction model outputs indicated by prediction data 122; ii) analyze features or parameters of a current batch process being executed to perform a real-time transaction operation; or iii) analyze data about previous attempts at remediating a particular computing process used to perform the real-time operation.

In response to performing one or more of items i, ii, and iii, module 210 can determine, for each script in the subset, an amount of relevance between the script and at least the runtime condition indicated by prediction data 122 and generate the respective confidence score for the script based on the determined amount of relevance. The confidence scores can quantify an extent to which execution of a particular process automation script will result in remediation of a failed computer process.

Script execution module 216 can receive one or more scripts of the subset and the confidence scores generated by module 210 for the respective scripts. In some implementations, confidence scores generated by module 210 can range from 0.1 to 1.0. Confidence scores that have a score value closer to 1.0 indicate high confidence that a particular script will result in remediating a failed computer process and confidence scores that have a score value closer to 0.1 indicate low confidence that a particular script will result in remediating a failed computer process.

After analysis of the respective scores, execution module 216 can identify the highest confidence score and the process automation script corresponding to the highest confidence score and execute the script to remediate a failed computer process. In some implementations, execution of the process automation script includes module 216 providing feedback data 218 to script selection module 210 that indicates an execution status of the process automation script, e.g., executing, execution complete, or execution failed. Additionally, execution of the process automation script can include script execution module 216 providing data about a remediation status of a failed computer process.

For example, system 120 includes a remediation status indicator 220, e.g., display device, for displaying or indicating a remediation status of a failed computer process. In some implementations, indicator 220 is accessed by users 202 to determine whether execution of a particular process automation script resulted in remediation of a failed computer process. When execution of a process automation script results in successful remediation of a failed computer process, data associated with remediation logs 204 can be modified or updated to identify particular scripts or remediation processes that are useful, or successful, for remediating one or more failed computer processes.

Figure 3:
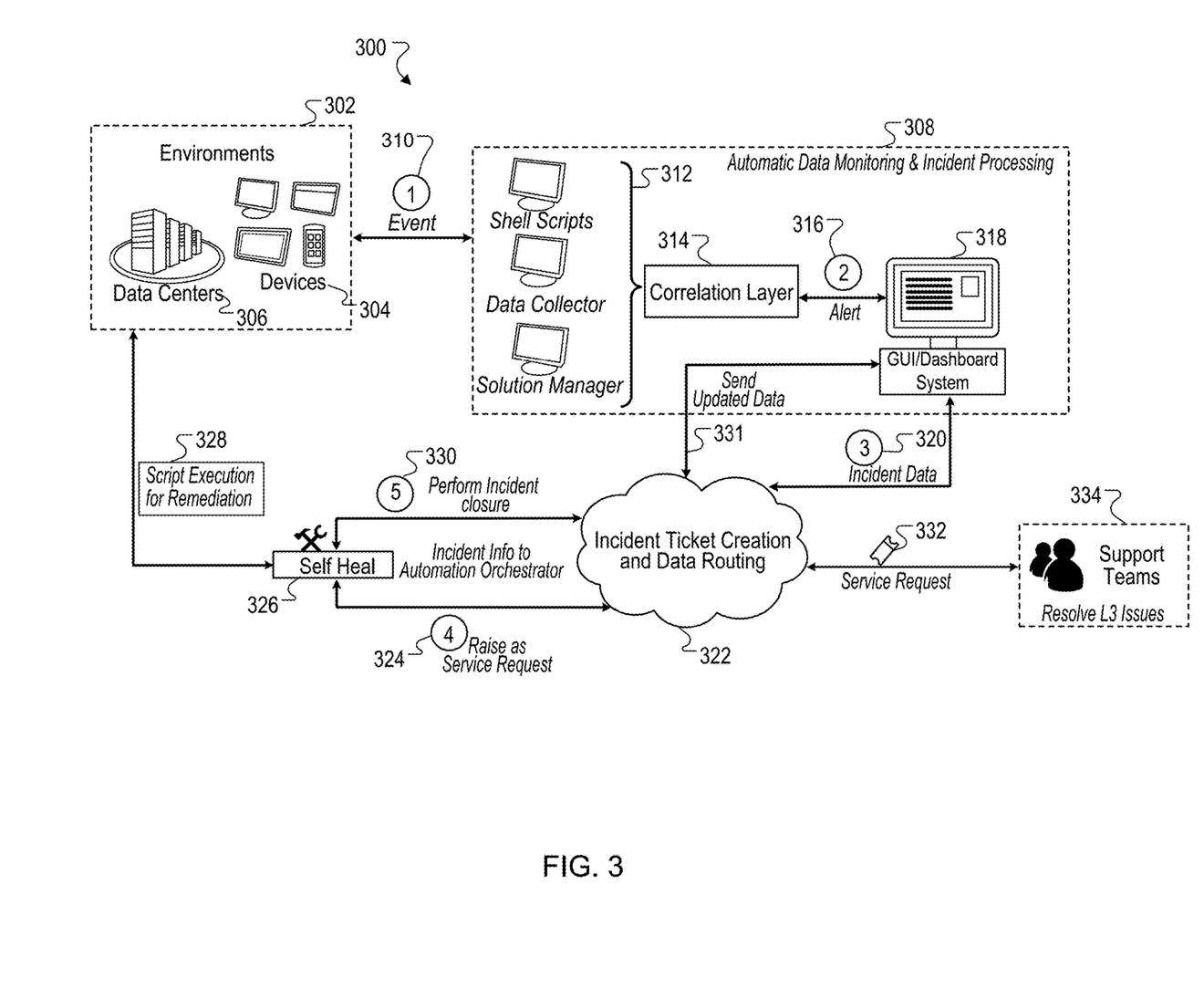
FIG. 3 illustrates a block diagram of an example computing environment where one or more computer processes are executed.

FIG. 3 illustrates a block diagram of an example computing environment 300 where computer processes are executed. Environment 300 includes a collection of networked systems that can be used to complete transactions between commercial entities, including invoice processing operations. In some implementations, environment 300 is a client server environment where networked systems 302 accomplish traditional mainframe data processing operations that can include distributing some processes to one or more remote/external computing servers.

As shown in FIG. 3, networked systems 302 includes devices that are associated with client devices 304 and data centers 306. Client devices 304 can include a variety of electronic computing devices, such as mobile devices, tablet devices, laptop computers, desktop computers, cellular smartphones, electronic readers, hybrid tablet/laptop devices, streaming devices, and other commercially available client devices. Data centers 306 can include electronic computing devices, such as client devices 304, and a variety of computing servers, thin client devices, thick client devices, and cloud-based or virtual computing resources. In some implementations, computing devices of systems 100, 120 are located in environment 300 or are accessible by networked systems 302.

In addition to networked systems 302, environment 300 also includes an architecture 308 that receives, analyzes, and processes event data 310. In some implementations, architecture 308 is an intelligent automated data monitoring architecture that can include at least a subset of the hardware components of systems 100, 120 described above. Thus, architecture 308 can be used to perform at least a subset of the computational operations and data processing functions described above with reference to FIGS. 1 and 2.

In general, computing devices of environment 300 can be used to perform an example transaction or operation in real-time. Moreover, features of environment 300 can monitor communication channels and computing resources that are used to accomplish performance of the transaction/operation. For example, environment 300 can be used to execute batch files that bundle sets of sequenced commands for accomplishing a particular transaction. The transaction can include a first commercial entity providing payment to a second commercial entity such the first entity can receive goods or services from the second entity. An example transaction may be referred to herein as a vendor payment transaction or operation.

In the context of batch file execution within environment 300, event data 310 can include information for initiating and executing the vendor payment transaction. Such information can identify batch files to be executed as well as datasets that include business data, technical data, and label data. For example, the business data can indicate the entities of the transaction (e.g., company A and company B), the technical data can indicate the communication channels and resource requirements for executing the batch files (e.g., CPU_1, memory_1, or estimated execution time), and the label data can identify the entities, the communication channels, the resources, or combinations of each.

In some implementations, event data 310 includes information about the real-time transaction, such as one or more of: i) contents of a commercial invoice for an exchange goods or services between the entities of the transaction; or ii) content items of information processed to provide pecuniary resources (e.g., payment) from a first entity of the transaction to a second entity of the transaction. Analysis and monitoring tools 312 can be used to analyze event data 310, monitor various aspects of the vendor payment transaction in real-time, and analyze real-time transaction data 118 generated when environment 300 executes computer processes to accomplish the vendor payment.

Analysis and monitoring tools 312 can include shell scripts, such as process automation scripts 208. In some implementations, shell scripts are computer programs that can be produced by script generator 206 and that are designed to be run/executed by a system shell, such as script execution module 216 or an example command-line interpreter of the Unix operating system. In some instances, a script generator can support a variety of scripting languages for generating shell scripts that correspond to process automation scripts 208.

Analysis and monitoring tools 312 can also include data collectors such as data manager 102 and training engine 112. Tools 312 may further include solution managers that communicate with the ML system and remediation processing system 120 to execute prediction model 116 and process automation modules of system 120. Correlation layer 314 can receive information relating to real-time transaction data 118 and prediction data 122 from monitoring tools 312. Correlation layer 314 correlates the received data 118, 122 by analyzing the data to determine runtime conditions with indications identifying failed computer processes.

Runtime conditions can include information, such as: i) a CPU_1 processor utilization metric that indicates an amount of processing resources being used when the system performs a real-time transaction; ii) a memory_1 utilization metric that indicates an amount of memory resources being used when the computing system performs the real-time transaction; or iii) a time parameter that indicates an amount of time the system has spent performing the real-time transaction operation. Runtime conditions can include indications of a failed computer process for performing the vendor payment when a CPU_1 usage metric exceeds a threshold processor usage metric, when a memory_1 usage metric exceeds a threshold memory usage metric, when a time value exceeds a threshold time value, or combinations of each.

Correlation layer 314 provides indications of failed computer processes as alerts 316 that are received by dashboard system 318 (described below). As described in more detail below, correlation layer 314 can facilitate data communications between multiple computing devices of environment 300 to enable automatic execution of one or more process automation scripts to remediate failed computer process indicated by alerts 316. In some implementations, incident data 320 can be provided to a server or cloud-based networking system 322 for creating an incident ticket and for providing data 320 and information about the incident ticket as a service request 324.

Dashboard system 318 provides a graphical representation of remediation status indicator 220 for displaying remediation status information to users 202, shown at FIG. 2. Dashboard system 318 can receive alerts 316 and generate a graphical user interface (GUI) for displaying the alerts as well as other information pertaining to runtime conditions, real-time transaction data 118, and predication data 122. In some implementations, alerts 316 and other data items can be displayed in a dashboard format to provide glanceable (or at-a-glance) informational views having details about computer processes for performing the vendor payment transaction.

Service request 324 can specify the runtime conditions that include indications identifying the failed computer process for performing the vendor payment. For example, service request 324 can indicate that processing of batch_file1 resulted in an 83% processor utilization of CPU_1, which exceeds the threshold processor usage metric of 70%. Moreover, service request 324 can also indicate that a current execution time for processing batch_file1 is 18 minutes, 36 seconds, which exceeds the threshold execution time of 15 minutes. Hence, the failed computer process can be identified as execution of batch_file1 using a processor device identified as CPU_1. In some instances, CPU_1 can be located on a hardware circuit of a computing server located in environment 300.

Self-heal computing logic 326 can be included in, or associated with, an example automation orchestrator module of the solution manager described above. In some implementations, self-heal logic 326 includes program code for analyzing data elements of service request 324 to determine the failed computer process requiring remediation. Based on this analysis, the automation orchestrator can use at least one process automation module of system 120 to select and execute a shell script (328) to remediate the failed computer process.

For example, execution of the shell script (e.g., a process automation script 208) can cause computing operations for processing batch_file1 to be terminated and restarted using the same processor, CPU_1, or using a different processor, CPU_2. In some implementations, execution of the shell script causes a power control circuit of the computing server to provide control signals for cycling power on/off at the hardware circuit for the processor, CPU_1. Cycling power at the hardware circuit for the processor can be used, in part, to terminate and restart processing of batch_file1.

Execution of self-heal logic 326 can include solution manger receiving and processing signal data for determining a remediation status of the failed computer process. For example, the solution manager can determine whether execution of a particular process automation script resulted in remediation of a failed computer process. When execution of a shell script results in successful remediation of the failed computer process, a notification 330 is generated by the solution manager for routing via network 322 to close an incident ticket for service request 324. A corresponding notification 331 with updated incident data can be provided for display, using dashboard system 118, to indicate closure of the incident ticket.

An example data analysis solution (e.g., a Splunk® solution) of environment 300 can analyze signal data about a remediation status of a failed computer process and, based on this analysis, generate status indicator 220 to specify the status of the attempts to correct the failed computer process. In some implementations, the data analysis solution analyzes the signal data and determines that execution of the shell script did not result in successful remediation of the failed computer process. When execution of a shell script does not remediate the failed computer process, a level 3 ticket for service request 332 is generated by a cloud computing platform (e.g., Service Now or other commercial platforms), routed via events generated by the data analysis solution, and received by diagnostic systems accessible to network administrators of support team 334.

Figure 4:
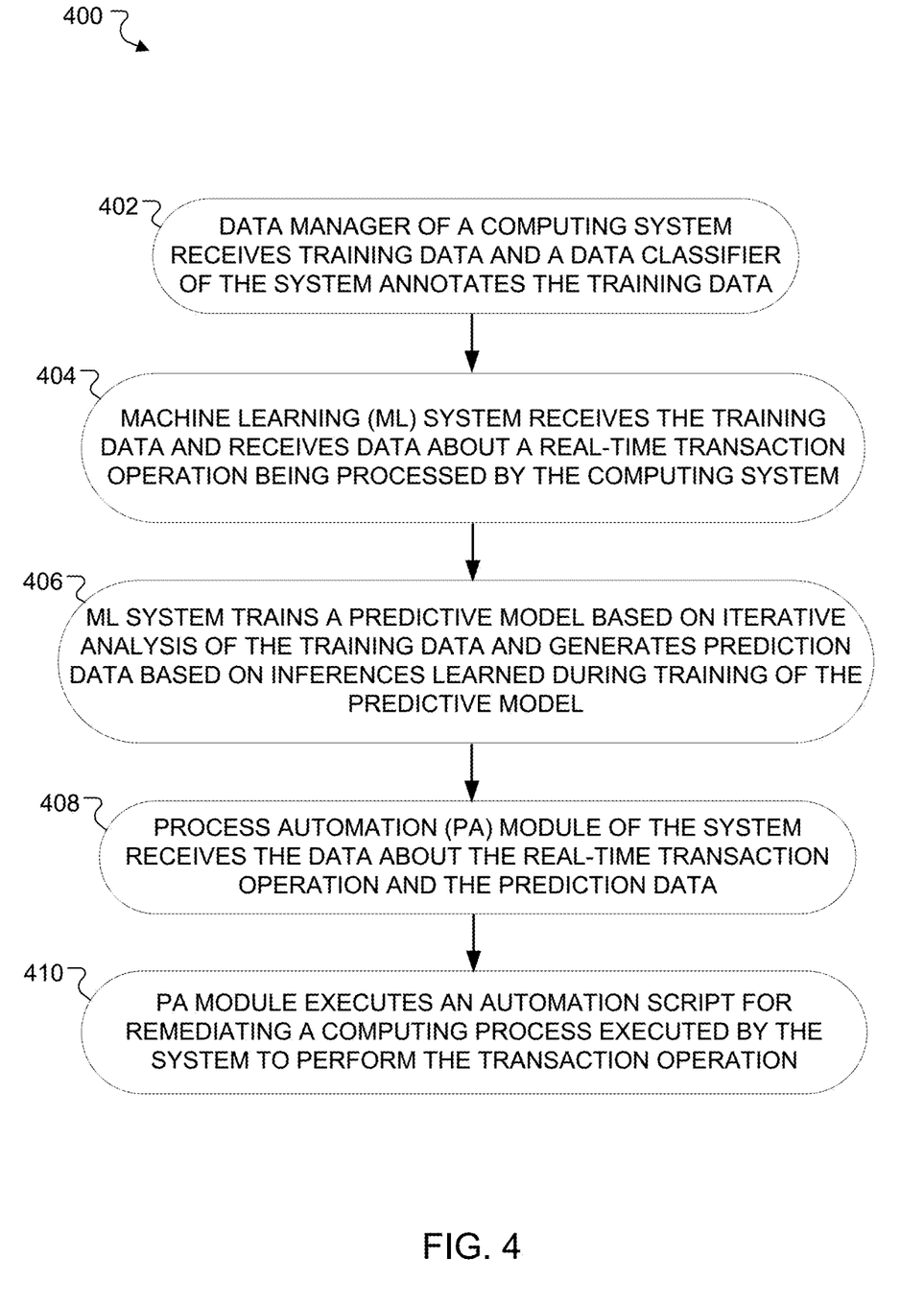
FIG. 4 illustrates a flow diagram of an example process for remediating a computer process.

FIG. 4 illustrates a flow diagram of an example process 400 for remediating a computer process. Process 400 can be implemented using systems 100, 120 described above. Thus, descriptions of process 400 may reference one or more of the above-described modules or computational devices of systems 100, 120. In some implementations, described actions for implementing process 400 are enabled by computing logic or software instructions executable by a processor and memory of hardware circuits and component devices of systems 100, 120 described above.

At block 402, process 400 includes data manager 102 of system 100 receiving training data for multiple datasets. The training data can include information about one or more computing processes that are executed by application programs or computing devices of an example computer network. A data classifier of system 100 annotates the training data as: 1) being associated with a particular dataset of the multiple datasets; 2) being descriptive of computing processes that are executed to perform multiple respective transactions, or both.

For example, annotating the training data can include the data classifier executing program code to scan or analyze the training data to identify a first portion of the training data as being linked to a technical information dataset of the multiple datasets received by system 100. Annotating the training data can also include the data classifier identifying at least a second portion of the training data as being linked to a commercial information dataset of the multiple datasets.

Additionally, the data classifier can execute program code for labeling the first portion and the second portion of the training data as data associated with successful execution of computing processes for performing a particular transaction operation. In some implementations, successful execution of a computer process occurs when a computer process begins, executes, and ends without stalling, failing, or experiencing substantial delay during execution, e.g., a delay that exceeds a threshold delay time.

At block 404, process 400 includes a machine learning ("ML") system of system 100 receiving the training data for the multiple of datasets and data about a real-time transaction operation of system 100. For example, at least a subset of annotated training data 110 is identified and provided, by training engine 112, to the ML system. The ML system uses the received real-time transaction data inputs 118, the received training data inputs, or both, to train a predictive model to generate predications indicating computer processes that require remediation.

At block 406, the ML system trains a predictive model 116 based on iterative analysis of the training data inputs and data inputs 118 for real-time transaction operations. The trained predictive model 116 can be configured to generate prediction data 122 based on inferences learned during training of the predictive model. Prediction data 122 can indicate a runtime condition of system 100 when system 100 performs the real-time transaction operation.

The ML system can include, or correspond to, a neural network processor configured to perform deep learning analytical processes that embody the respective inference or prediction capabilities of prediction model 116. In some implementations, the neural network processor of system 100 can be a single neural network processor microchip or multiple respective neural network processors that cooperate and interact to generate prediction data 122.

System 100, 120, or the ML system can generate control signals to cause at least one neural network processor to execute program code for performing the inference computations described above. Executing the program code can include using at least one machine learning algorithm to perform deep learning analytics. In some implementations, the algorithms include a single value decomposition algorithm or other related machine learning algorithms (e.g., maximum likelihood estimation algorithm).

At block 408 of process 400, a process automation module of system 100 receives the prediction data 122 generated by prediction model 116, where the prediction data indicates the runtime condition and the data about the real-time transaction operation. At block 410, process 400 includes the process automation module executing at least one process automation script based, at least in part, on the runtime condition. In some implementations, the process automation script includes automated processes for remediating a computing process being executed by system 100 to perform the real-time transaction operation.

Executing a process automation script can include the process automation module accessing one or more remediation logs 204, where each remediation log can be a log file that include data about remediating different computing/computer processes. The process automation module can use script generator 206 to generate the multiple process automation scripts and store the process automation scripts 208 in an example script repository of a storage medium. The stored scripts can be accessed by selection module 210 and executed by module 216 to remediate a failed computer process.

Figure 5:
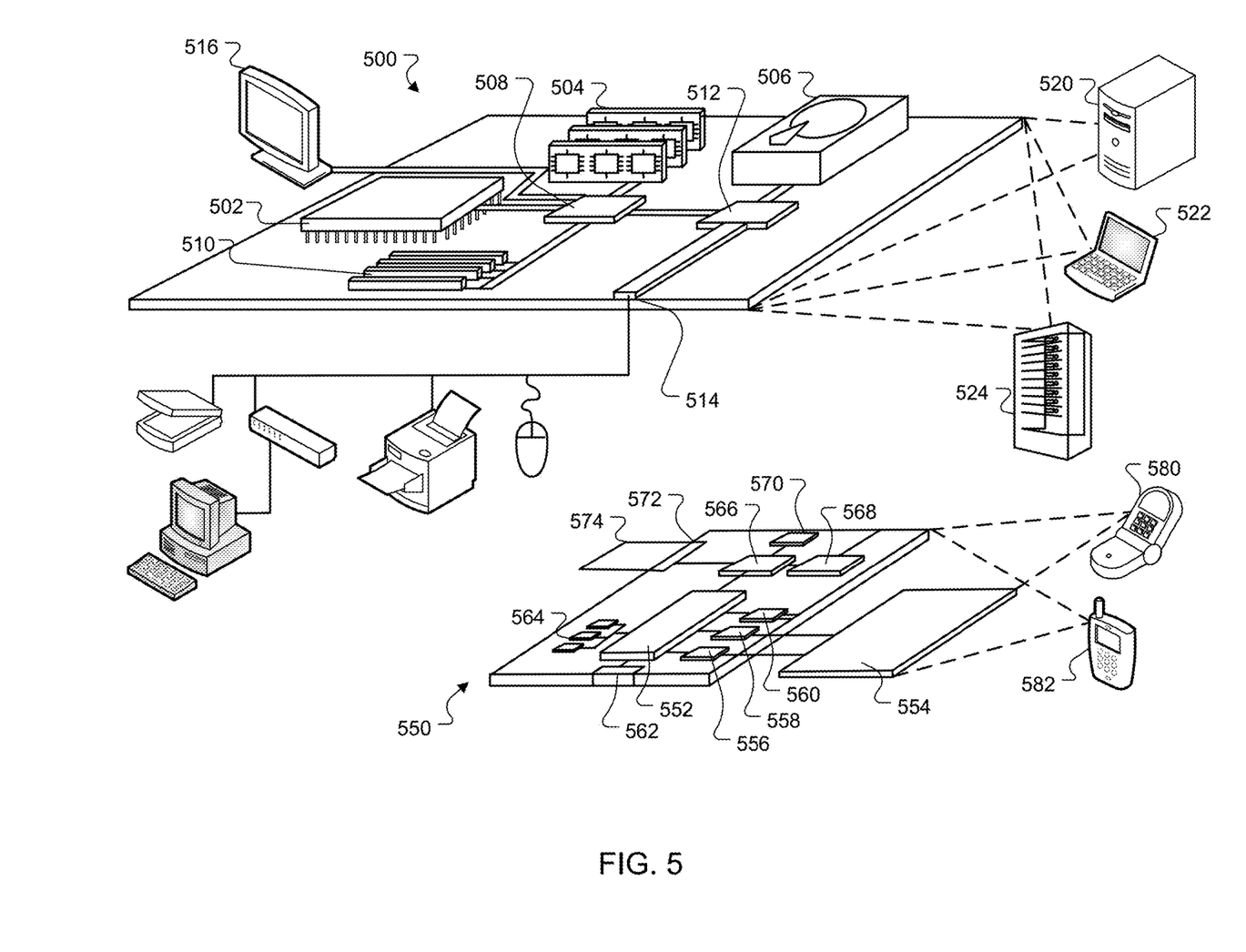
FIG. 5 illustrates a block diagram of a computing system that can be used in connection with computer-implemented methods described in this specification.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface.

Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550. The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving, at a data manager of a computing system, training data sets that each comprise information about one or more computing processes;
   annotating, by a data classifier of the computing system, each of the training data sets with labels indicating:
      one or more datasets of a plurality of datasets that are associated with the training data set;
      one or more transactions that were to be performed by executing the one or more computing processes of the training data set; and
      whether past execution of the one or more computing processes of the training data set resulted in successful, completed execution or in a computer process failure;
   receiving, at a machine learning system of the computing system, the annotated training data;
   training, at the machine learning system of the computing system, a predictive model using the annotated training data to predict, for input real-time computing processes that have begun to be executed and that have not yet successfully completed execution, whether continued execution of the input real-time computing processes is likely to result in successful, completed execution or in a computer process failure;
   after the computing system has begun executing a particular real-time computing process, determining that execution of the particular real-time computing process has delayed past a threshold delay time that is associated with computer process failures;
   after determining that the execution of the particular real-time computing process has delayed past the threshold delay time, determining, using the trained predictive model, that continued execution of the particular real-time computing process is likely to result in a computer process failure;
   in response to determining that continued execution of the particular real-time computing process is likely to result in a computer process failure, determining a runtime condition of the computing system;
   identifying by a process automation module, at least one process automation script as most likely to result in a successful remediation of the runtime condition of the computing system; and
   executing, by the process automation module, the at least one process automation script that is identified as most likely to result in a successful remediation of the runtime condition.

2. The method of claim 1, comprising:
   performing, using a neural network of the machine learning system, inference computations for deep-learning operations based on analysis of the annotated training data for the plurality of datasets; and
   generating, by the machine learning system, the predictive model based on the deep-learning operations performed by the neural network.

3. The method of claim 1, wherein selecting at least one process automation script comprises identifying, by the computing system, an opportunity to remediate the particular real-time computing process.

4. The method of claim 1, wherein annotating the training data by the data classifier comprises:
- identifying a first portion of the training data as being linked to a technical information dataset of the plurality of datasets; and
- identifying a second portion of the training data as being linked to a commercial information dataset of the plurality of datasets.

5. The method of claim 1, wherein selecting at least one process automation script comprises:
- accessing a script repository that includes a plurality of process automation scripts and identifying at least a subset of scripts from among the plurality of process automation scripts; and
- generating a respective confidence score for each script in the subset of scripts based on a likelihood of each of the subset of scripts resulting in a successful remediation of the runtime condition.

6. The method of 5, wherein generating a respective confidence score for each script in the subset of scripts comprises:
- analyzing data about the particular real-time comping process, and data about previous attempts at remediating other computing processes;
- in response to analyzing the data, determining a relevance measure; and
- generating the respective confidence score for the script based on the determined relevance measure.

7. The method of claim 6, comprising:
- accessing, by the process automation module, a plurality of remediation logs that each include data about remediating the other computing processes;
- using, by the process automation module, a process automation script generator to generate the plurality of process automation scripts; and
- storing, by the process automation module, the plurality of process automation scripts in the script repository.

8. A computing system comprising:
- one or more processing devices;
- one or more non-transitory machine-readable storage devices for storing instructions that are executable by the one or more processing devices to cause performance of operations comprising:
  - receiving, at a data manager, training data sets that each comprise information about one or more computing processes;
  - annotating, by a data classifier, each of the training data sets with labels indicating:
    - one or more datasets of a plurality of datasets that are associated with the training data set;
    - one or more transactions that were to be performed by executing the one or more computing processes of the training data set; and
    - whether past execution of the one or more computing processes of the training data set resulted in successful, completed execution or in a computer process failure;
  - receiving, at a machine learning system, the annotated training data;
  - training, at the machine learning system, a predictive model using the annotated training data to predict, for input real-time computing processes that have begun to be executed and that have not yet successfully completed execution, whether continued execution of the input real-time computing processes is likely to result in successful, completed execution or in a computer process failure;
  - after execution of a particular real-time computing process has begun, determining that execution of the particular real-time computing process has delayed past a threshold delay time that is associated with computer process failures;
  - after determining that the execution of the particular real-time computing process has delayed past the threshold delay time, determining, using the trained predictive model, that continued execution of the particular real-time computing process is likely to result in a computer process failure;
  - in response to determining that continued execution of the particular real-time computing process is likely to result in a computer process failure, determining a runtime condition of the computing system;
  - identifying, by a process automation module, at least one process automation script as most likely to result in a successful remediation of the runtime condition of the computing system; and
  - executing, by the process automation module, the at least one process automation script that is identified as most likely to result in a successful remediation of the runtime condition.

9. The system of claim 8, wherein the operations comprise:
- performing, using a neural network of the machine learning system, inference computations for deep-learning operations based on analysis of the annotated training data for the plurality of datasets; and
- generating, by the machine learning system, the predictive model based on the deep-learning operations performed by the neural network.

10. The system of claim 8, wherein selecting at least one process automation script comprises identifying, by the computing system, an opportunity to remediate the particular real-time computing process.

11. The system of claim 8, wherein annotating the training data by the data classifier comprises:
- identifying a first portion of the training data as being linked to a technical information dataset of the plurality of datasets; and
- identifying a second portion of the training data as being linked to a commercial information dataset of the plurality of datasets.

12. The system of claim 8, wherein selecting at least one process automation script comprises:
- accessing a script repository that includes a plurality of process automation scripts and identifying at least a subset of scripts from among the plurality of process automation scripts; and
- generating a respective confidence score for each script in the subset of scripts based on a likelihood of each of the subset of scripts resulting in a successful remediation of the runtime condition.

13. The system of claim 12, wherein generating a respective confidence score for each script in the subset of scripts comprises:
- analyzing data about the particular real-time comping process, and data about previous attempts at remediating other computing processes;
- in response to analyzing the data, determining a relevance measure; and generating the respective confidence score for the script based on the determined relevance measure.

14. The system of claim 13, wherein the operations comprise:
accessing, by the process automation module, a plurality of remediation logs that each include data about remediating the other computing processes;
using, by the process automation module, a process automation script generator to generate the plurality of process automation scripts; and
storing, by the process automation module, the plurality of process automation scripts in the script repository.

15. Computer program instructions that are stored on one or more non-transitory computer readable media and that are executable by one or more processing devices to cause performance of operations comprising:
receiving, at a data manager of a computing system, training data sets that each comprise information about one or more computing processes;
annotating, by a data classifier of the computing system, each of the training data sets with labels indicating:
one or more datasets of a plurality of datasets that are associated with the training data set;
one or more transactions that were to be performed by executing the one or more computing processes of the training data set; and
whether past execution of the one or more computing processes of the training data set resulted in successful, completed execution or in a computer process failure;
receiving, at a machine learning system of the computing system, the annotated training data;
training, at the machine learning system of the computing system, a predictive model using the annotated training data to predict, for input real-time computing processes that have begun to be executed and that have not yet successfully completed execution, whether continued execution of the input real-time computing processes is likely to result in successful, completed execution or in a computer process failure;
after the computing system has begun executing a particular real-time computing process, determining that execution of the particular real-time computing process has delayed past a threshold delay time that is associated with computer process failures;
after determining that the execution of the particular real-time computing process has delayed past the threshold delay time, determining, using the trained predictive model, that continued execution of the particular real-time computing process is likely to result in a computer process failure;
in response to determining that continued execution of the particular real-time computing process is likely to result in a computer process failure, determining a runtime condition of the computing system;
identifying, by a process automation module, at least one process automation script as most likely to result in a successful remediation of the runtime condition of the computing system; and
executing, by the process automation module, the at least one process automation script that is identified as most likely to result in a successful remediation of the runtime condition.

16. The instructions of claim 15, wherein the operations comprise:
performing, using a neural network of the machine learning system, inference computations for deep-learning operations based on analysis of the annotated training data for the plurality of datasets; and
generating, by the machine learning system, the predictive model based on the deep-learning operations performed by the neural network.

17. The instructions of claim 15, wherein selecting at least one process automation script comprises identifying, by the computing system, an opportunity to remediate the particular real-time computing process.

18. The instructions of claim 15, wherein annotating the training data by the data classifier comprises:
identifying a first portion of the training data as being linked to a technical information dataset of the plurality of datasets; and
identifying a second portion of the training data as being linked to a commercial information dataset of the plurality of datasets.

19. The instructions of claim 15, wherein selecting at least one process automation script comprises:
accessing a script repository that includes a plurality of process automation scripts and identifying at least a subset of scripts from among the plurality of process automation scripts; and
generating a respective confidence score for each script in the subset of scripts based on a likelihood of each of the subset of scripts resulting in a successful remediation of the runtime condition.

20. The instructions of claim 19, wherein generating a respective confidence score for each script in the subset of scripts comprises:
analyzing data about the particular real-time comping process, and data about previous attempts at remediating other computing processes;
in response to analyzing the data, determining a relevance measure; and
generating the respective confidence score for the script based on the determined relevance measure.

21. The instructions of claim 20, wherein the operations comprise:
accessing, by the process automation module, a plurality of remediation logs that each include data about remediating the other computing processes;
using, by the process automation module, a process automation script generator to generate the plurality of process automation scripts; and
storing, by the process automation module, the plurality of process automation scripts in the script repository.

* * * * *

UNITED STATES PATENT AND TRADEMARK OFFICE
CERTIFICATE OF CORRECTION

PATENT NO. : 11,797,877 B2
APPLICATION NO. : 15/728771
DATED : October 24, 2023
INVENTOR(S) : Sunil Sharma, Rajendra Venkata Palem and Amit Agarwal It is certified that error appears in the above-identified patent and that said Letters Patent is hereby corrected as shown below:

In the Claims

In Claim 1, Column 18, Line 52, delete "identifying" and insert -- identifying, --.

In Claim 6, Column 19, Line 23, after "of" insert -- claim --.

In Claim 6, Column 19, Line 26, delete "comping" and insert -- computing --.

In Claim 13, Column 20, Line 63, delete "comping" and insert -- computing --.

In Claim 20, Column 22, Line 41, delete "comping" and insert -- computing --.

Signed and Sealed this
Ninth Day of January, 2024

Katherine Kelly Vidal
*Director of the United States Patent and Trademark Office*